No. 887,712. PATENTED MAY 12, 1908.
F. TYSON.
APPARATUS FOR HEATING, COOLING, AND PASTEURIZING LIQUIDS.
APPLICATION FILED MAY 9, 1907.

Witnesses
Hamilton D. Turner
Harry L. Smith

Inventor
Frank Tyson
by his Attorneys
Smith & Frazier

UNITED STATES PATENT OFFICE.

FRANK TYSON, OF CANTON, OHIO.

APPARATUS FOR HEATING, COOLING, AND PASTEURIZING LIQUIDS.

No. 887,712.　　　　Specification of Letters Patent.　　　Patented May 12, 1908.

Application filed May 9, 1907. Serial No. 372,777.

*To all whom it may concern:*

Be it known that I, FRANK TYSON, a citizen of the United States, residing in Canton, Ohio, have invented certain Improvements in Apparatus for Heating, Cooling, or Pasteurizing Liquids, of which the following is a specification.

Figure 1:
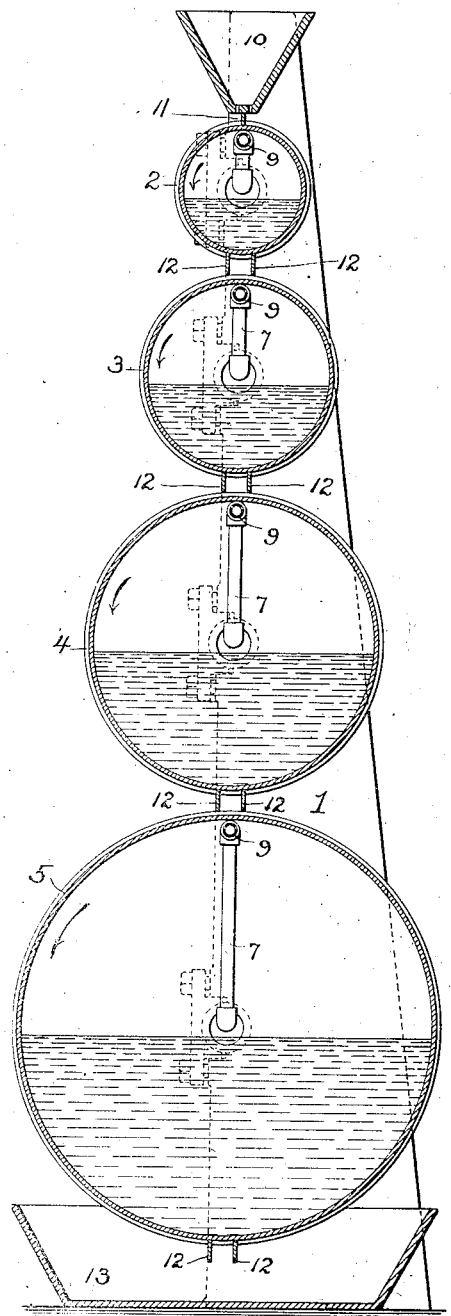
Figure 2:
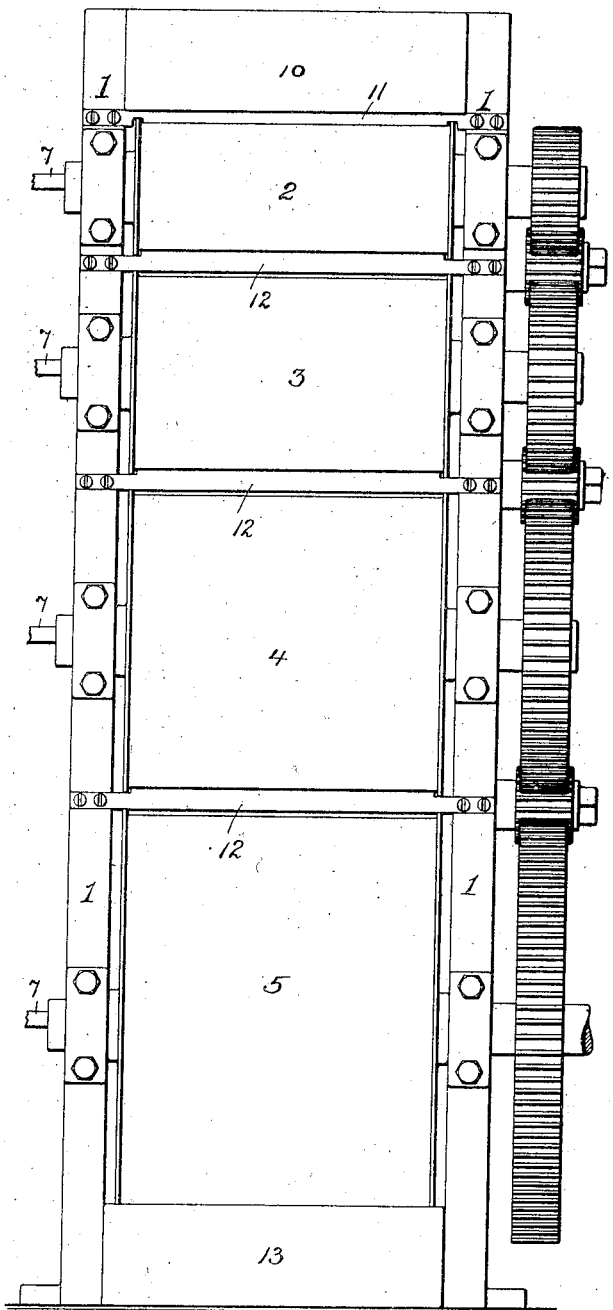

The object of my invention is to provide simple and efficient apparatus for the heating, cooling or pasteurization of milk or other liquids, an object which I attain in the manner hereinafter set forth, reference being had to the accompanying drawing, in which Figure 1 is a vertical sectional view of apparatus constructed in accordance with my invention, and Fig. 2 is a side elevation of the same.

In the drawing, 1—1 represent opposite upright frames or standards having bearings for the shafts or spindles of a series of hollow drums 2, 3, 4 and 5 disposed one above another, one of the shafts of each drum being geared to a corresponding shaft of the next drum through the medium of an idle gear, whereby all of the drums are rotated in the same direction. The other shaft of each drum is hollow for the reception of a pipe 7, whereby water or other heating or cooling fluid can be introduced into the interior of the drum, each of these pipes terminating within the drum in a longitudinal tube 9 located adjacent to the periphery of the drum, preferably at the top of the same, and perforated on opposite sides in order to provide for the delivery of the heating or cooling fluid into the drum in the form of jets which impinge upon the inner wall of the drum and flow downwardly on each side of the same so as to heat or cool the shell of the drum, the water or other fluid accumulating in the lower portion of the drum and escaping therefrom through the hollow shaft as soon as it reaches the level of the latter and the waste being collected in any suitable receptacle in order that it may be conveyed to a suitable point of discharge. The hollow drums are, by preference, of varying diameters increasing from the top downwardly, thereby providing a gradual increase of peripheral surface.

At the top of the standards 1 is a transverse trough 10, having, in the bottom, outlets on opposite sides of a separator plate 11, whereby the flow from the trough is directed to the uppermost drum on opposite sides of the center of the same, a portion of the flow, therefore, following the surface of the drum on the descending side of the same and the remaining portion of the flow following the surface of the drum on the ascending side of the same. The flow is limited to such an extent that it forms a realtively thin film on each drum, which has a tendency to adhere to the surface of the drum and follow the same from top to bottom instead of dropping from the surface of the drum at the center of the same as it would have a tendency to do if in larger volume.

At the bottom of the drum is a pair of scraper blades 12, which have the effect of removing the film of liquid from the surface of the drum and directing it onto the upper portion of the drum beneath, and in this way the film of liquid follows the surface of each drum from top to bottom and is finally removed from the lowermost drum and directed into a receiving trough 13 or other suitable receptacle for the purpose.

If the apparatus is to be used as a heater all of the drums will be supplied interiorly with steam, hot water, or other heating fluid, while, if, on the other hand, the apparatus is to be used as a cooler a cooling liquid will be supplied in like manner, the temperature of the fluid being preferably increased from drum to drum in succession in the case of a heater, or being lowered in temperature from drum to drum in succession in the case of a cooler.

The apparatus as shown in the drawing has been designed for use as a pasteurizer, in which case the upper drums 2 and 3 may be supplied with heating fluid and the lower drums 4 and 5 with cooling fluid. The uppermost drum 2 may be supplied with hot water the next drum 3 with steam, the third drum 4 with cold water, and the lowermost drum 5 with brine, the material increase in the peripheral surface presented by the drums 4 and 5 in this case providing the increased area of travel which is advisable in connection with the colling members of a pasteurizing device. An apparatus comprising only two drums may be used if desired, the upper drum being a heating drum, and the lower drum a cooling drum. The capacity of the machine can be regulated to accord with the requirements upon it by varying the speed of rotation of the drums, care being taken, of course, to so limit the speed that the centrifugal action will not tend to cause the film of liquid under treatment to be thrown off from the drum.

Although I have shown the apparatus as of duplex character, that is to say, as providing for the feeding of liquid to be treated to both the descending and ascending sides of each drum, said liquid may be fed to one side of the drum only, if desired, preferably to the the descending side, and although I prefer in each case to use a scraper or scrapers in connection with the under portion of each drum, the use of such scraper or scrapers is not essential to the broader embodiment of my invention.

When the liquid to be treated is applied to one side of the drum only, the internal heating of the drum is not essential, as in such case the heating or cooling agent can be applied externally to the other side of the drum, and, as will be evident, in a structure of this character, the drum or drums can be solid instead of hollow. In all cases, however, the drums, whether or not they are internally heated or cooled, are preferably made hollow in order to avoid excessive weight.

I claim:—

1. Apparatus for effecting the heating or cooling of liquids, said apparatus comprising, in combination, a series of rotating drums disposed directly one above another, means for heating or cooling said drums and means for supplying the liquid to be treated to the exterior of the uppermost drum.

2. Apparatus for effecting the heating or cooling of liquids, said apparatus comprising, in combination, a series of hollow rotating drums disposed directly one above another, means for interiorly heating or cooling said drums, and means for supplying the liquids to be treated to the exterior of the uppermost drum.

3. Apparatus for effecting the heating or cooling of liquids said apparatus comprising, in combination, a series of rotating drums disposed directly one above another, means for supplying the liquid to be treated to the upper portion of the uppermost drum, means for heating or cooling the drums, and means for removing the film of liquid from an upper drum and directing it onto the drum below.

4. Apparatus for effecting the heating or cooling of liquids, said apparatus comprising, in combination, a series of hollow rotating drums disposed directly one above another, means for supplying the liquid to be treated to the upper portion of the uppermost drum, means for interiorly heating or cooling the drums, and means for removing the film of liquid from an upper drum and directing it onto the drum below.

5. Apparatus for effecting the pasteurization of liquids, said apparatus comprising a series of rotating drums disposed directly one above another, means for heating an upper member or members of the series and for cooling a lower member or members of the same, means for supplying the liquid to be treated to the upper portion of the uppermost drum, and means for removing the film of liquid from an upper drum and directing it onto the drum beneath.

6. Apparatus for effecting the pasteurization of liquids, said apparatus comprising a series of hollow rotating drums disposed directly one above another, means for interiorly heating an upper member or members of the series and for interiorly cooling a lower member or members of the same, means for supplying the liquid to be treated to the upper portion of the uppermost drum, and means for removing the film of liquid from an upper drum and directing it onto the drum beneath.

7. Pasteurizing apparatus comprising a series of rotating drums disposed one above another, a lower member or members of the series being of greater diameter than the upper member or members, means for heating the upper member or members and cooling the lower member or members, and means for supplying the liquid to be treated to an upper drum.

8. Pasteurizing apparatus comprising a series of hollow rotating drums disposed one above another, a lower member or members of the series being of greater diameter than the upper member or members, means for interiorly heating the upper member or members and interiorly cooling the lower member or members, and means for supplying the liquid to be treated to an upper drum.

9. Pasteurizing apparatus comprising a series of rotating drums disposed directly one above another, a lower member or members of the series being of greater diameter than an upper member or members, means for heating the upper member or members and cooling the lower member or members, means for supplying the liquid to be treated to an upper drum, and means for removing the film of liquid from an upper drum of the series and directing it onto a drum beneath.

10. Pasteurizing apparatus comprising a series of hollow rotating drums disposed directly one above another, a lower member or members of the series being of greater diameter than an upper member or members, means for interiorly heating the upper member or members and interiorly cooling the lower member or members, means for supplying the liquid to be treated to an upper drum, and means for removing the film of liquid from an upper drum of the series and directing it onto a drum beneath.

11. In apparatus for effecting the heating or cooling of liquids, the combination of a hollow revolving drum, means for supplying the liquid to be treated to the exterior of the upper portion of said drum, and means for supplying a heating or cooling agent, in the form of jets, to the interior of the upper portion of the drum.

12. In apparatus for effecting the heating or cooling of liquids, the combination of a hollow rotating drum, means for supplying the liquid to be treated to the exterior of the upper portion of the drum, means for supplying a heating or cooling agent, in the form of jets, to the interior of the upper portion of the drum, and means for draining such agent from the drum as it accumulates therein.

13. In apparatus for effecting the pasteurization of liquids, the combination of a series of hollow rotating drums, disposed one above another, means for supplying the liquid to be treated to the outer surface of an upper drum, and means for interiorly heating, by means of jets, an upper drum or drums of the series and for cooling in like manner a lower drum or drums of the series.

14. In apparatus for effecting the pasteurization of liquids, the combination of a series of hollow rotating drums disposed one above another, means for supplying the liquid to be treated to the surface of an upper drum, means for interiorly heating, by means of jets, an upper drum or drums of the series and cooling in like manner a lower drum or drums of the series, and means for draining the heating or cooling agent from each drum as it accumulates therein.

In testimony whereof, I have signed my name to this specification, in the presence of two subscribing witnesses.

FRANK TYSON.

Witnesses:
CLAUDE CLENDENING,
WM. SIMPSON.